United States Patent
Buettner

(10) Patent No.: US 8,341,990 B2
(45) Date of Patent: Jan. 1, 2013

(54) CUTTING AND/OR FORMING PLATE WORKPIECES

(75) Inventor: Stefan Buettner, Markgroeningen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 507 days.

(21) Appl. No.: 12/579,558

(22) Filed: Oct. 15, 2009

(65) Prior Publication Data

US 2010/0095726 A1    Apr. 22, 2010

(30) Foreign Application Priority Data

Oct. 20, 2008    (EP) .................................... 08018315

(51) Int. Cl.
    *B21C 51/00* (2006.01)
(52) U.S. Cl. ................ 72/20.3; 72/333; 72/444; 72/446
(58) Field of Classification Search ............... 72/20.1, 72/20.2, 20.3, 71, 332, 333, 334, 337, 348, 72/441, 444, 446
    See application file for complete search history.

(56) References Cited

U.S. PATENT DOCUMENTS

| | | | | |
|---|---|---|---|---|
| 3,377,700 A | * | 4/1968 | Cooley | 29/882 |
| 3,481,175 A | * | 12/1969 | White | 72/333 |
| 4,573,338 A | * | 3/1986 | Daudi | 72/333 |
| 5,237,849 A | * | 8/1993 | Miyazawa | 72/335 |
| 5,448,832 A | * | 9/1995 | Kanemitsu et al. | 29/892.2 |
| 6,658,908 B1 | * | 12/2003 | Ghiran et al. | 72/55 |
| 7,484,312 B2 | * | 2/2009 | Morgan | 33/645 |
| 2009/0107204 A1 | | 4/2009 | Widdel et al. | |

FOREIGN PATENT DOCUMENTS

| | | |
|---|---|---|
| DE | 102006015458 | 10/2007 |
| FR | 2803782 | 7/2001 |
| JP | 04100645 | 4/1992 |
| JP | 10323722 | 12/1998 |
| JP | 2004216416 | 8/2004 |

OTHER PUBLICATIONS

European Search Report for corresponding European Application No. EP 08 01 8315, mailed Feb. 13, 2009, 6 pages.

* cited by examiner

*Primary Examiner* — Edward Tolan
(74) *Attorney, Agent, or Firm* — Fish & Richardson P.C.

(57) ABSTRACT

A method for processing a plate workpiece supported on a workpiece support. The method includes moving a tool die and a tool punch along a stroke axis and toward a processing position above a support plane of the workpiece support. The processing position corresponds to a region of the plate workpiece having a formed shape, which extends upwardly from the support plane of the workpiece support.

10 Claims, 3 Drawing Sheets

CUTTING AND/OR FORMING PLATE WORKPIECES

CROSS REFERENCE OF RELATED APPLICATION

Under 35 U.S.C. §119, the application claims the benefit of European Application No. EP 08 018 315.5, filed Oct. 20, 2008. The content of this priority application is hereby incorporated by reference in its entirety.

TECHNICAL FIELD

This invention relates to the processing, e.g., the cutting and/or forming, of plate workpieces, such as metal sheets, and tools configured to do such processing.

BACKGROUND

Flexible processing of metal sheets by cutting and/or forming can be performed by means of punching/forming machines. Some known machines permit various workpiece processing operations to be performed on the same machine tool. For example, sheet metal parts may be cut free from a sheet metal composite and forming operations may be performed on those sheet metal parts. An example of such a machine tool is the TruPunch® 5000 punching machine offered by Trumpf Werkzeugmaschinen GmbH+Co. KG which has mono-tool holders. The mono-tool holders support a single tool that includes a tool punch and a tool die. Further tools can be taken from a tool magazine and inserted as alternative tools into the mono-tool holders as and when required.

The mono-tool holders have a tool punch holder that can be raised and lowered by means of a hydraulic stroke drive, and a stationary tool die holder. A workpiece table serves to support a metal sheet that is to be processed. Workpiece processing is effected by lowering the tool punch holder together with a tool punch secured thereto onto the metal sheet supported on the workpiece table. The metal sheet is acted upon by the tool punch on the one side and by the tool die on the other.

Where a workpiece is subject to a forming operation, for example by roll-forming, in a region that was previously processed by a punching operation, the punched contour, produced by the punching operation, may change as a result of the forming operation, i.e., the punched contour may no longer correspond to the original contour produced by the punching operation.

SUMMARY

In general, this invention relates to the processing, e.g., the cutting and/or forming, of plate workpieces, such as metal sheets, and tools configured to do such processing.

One aspect of the invention features a plate workpiece processing method. The method includes supporting a plate workpiece on a workpiece support. The plate workpiece has a region with a formed shape that extends upwardly from a support plane of the workpiece support. The method also includes moving a tool die and a tool punch along a stroke axis, toward a processing position above the support plane, and into contact with the plate workpiece in the region of the formed shape, thereby processing the plate workpiece in the region of the formed shape.

In some embodiments, the method also includes forming, e.g., by roll-forming, the formed shape in the plate workpiece.

The forming can performed while the plate workpiece is supported on the workpiece support. In some cases, following the forming of the formed shape, the method also includes moving the plate workpiece along the support plane toward a position in which the formed shape intersects the stroke axis.

The method can also include moving the tool punch and the tool die to a home position in which the tool die does not project upwards beyond the support plane and the tool punch does not project downwards beyond the support plane.

In some cases, the tool die is supported in a tool die holder and the tool punch is supported in a tool punch holder, and moving the tool die and the tool punch along the stroke axis includes moving the tool die holder and the tool punch holder along the stroke axis.

The tool die and the tool punch can be moved independently of each other along the stroke axis.

In some embodiments, the method includes detecting the presence of the tool die in the processing position.

The method can also include moving the plate workpiece along the support plane toward a position in which the formed shape intersects the stroke axis. The movement of the plate workpiece can be carried out by means of a coordinate guide.

In another aspect, a computer readable medium has encoded thereon software for processing a plate workpiece supported on a workpiece support. The software includes instructions for moving a tool die and a tool punch along a stroke axis and toward a processing position above a support plane of the workpiece support. The processing position corresponds to a region of the plate workpiece having a formed shape, which extends upwardly from the support plane of the workpiece support.

Another aspect of the invention provides a plate workpiece processing tool that includes a workpiece support, a tool punch, a tool die, and a control unit that is configured to control movements of the tool punch and the tool die along a stroke axis. The workpiece support defines a support plane for supporting a workpiece. The tool punch and the tool die are displaceable, along the stroke axis, to a processing position above the support plane of the workpiece support such that the tool punch and the tool die are capable of processing a region of a workpiece that has a formed shape that extends upwardly from the workpiece support.

In some embodiments, the tool also includes a tool punch holder for supporting the tool punch, a tool die holder for supporting the tool die, and a tool drive in communication with the control unit. The control unit is configured to control movements of the tool punch holder and the tool die holder, along the stroke axis, via the tool drive.

In some cases, the tool die is in the shape of a pyramidal frustum or a conical frustum.

The tool can also include a sensor unit that is arranged to sense the presence of the tool die in the processing position.

In some embodiments, the tool includes a coordinate guide that is operable to control movements of a workpiece along the support plane.

The workpiece support can be a bristle carpet, which forms the support plane.

The control unit can include a memory storage that includes stored workpiece data corresponding to a formed shape in a workpiece. The control unit can be configured to control movements of the tool punch and the tool die based, at least in part, on the stored workpiece data.

In yet another aspect, the invention features a method for processing a plate workpiece supported on a workpiece support, in which a tool punch and a tool die are moved to a processing position above or below a support plane on the workpiece support in order to process the workpiece in a region of a formed shape projecting upwards or downwards beyond the workpiece support.

By moving the tool die or the tool punch to a processing position above or below the support plane, processing by cutting and/or forming may be carried out on formed shapes of the workpiece. In some cases, the tool die may be raised or lowered until a support face of the tool die reaches an underside of the formed shape and supports the formed shape of the workpiece while it is being acted upon by the tool punch. The tool die may, for example, be positioned in the processing position before the tool punch is lowered onto the formed shape of the workpiece. Alternatively, the tool punch and the tool die can be moved synchronously in order to process the workpiece at the processing position. The location of the processing position above or below the workpiece plane or support plane is variable and depends on how far the formed shape produced in the workpiece, or rather the region that is to be processed in that formed shape, projects beyond the workpiece plane.

In some embodiments, the formed shape is made in the workpiece, while it is resting on the workpiece support, by forming (e.g., roll-forming). The formed shape may then be processed by punching and/or rim holes or screw-threads may by formed in the formed shape and/or additional downwardly or upwardly formed shapes may be made in the formed shape. It will be appreciated that it is not imperative that the forming of the formed shape is performed on the machine tool. As an alternative, it is also possible for a workpiece having one or more formed shapes to be loaded onto the workpiece support.

In some cases, the tool punch and the tool die are taken to a home position in which the tool die does not project upwards and the tool punch does not project downwards beyond the support plane. To position a region of a workpiece that is to be processed—in the present case at the formed shape—in a position on the workpiece support where the tool die and the tool punch are situated, the workpiece may be moved along the workpiece support by means of a coordinate guide. To prevent collision of the workpiece with the tool die and/or the tool punch during that movement, they may be retracted to a home position in which, for example, the support face of the tool die is flush with the workpiece support or is disposed below the workpiece support. To facilitate movement of the workpiece along the workpiece support, castors or a bristle carpet, for example, may be provided on the workpiece support.

In some cases, the tool die is supported in a tool die holder and the tool punch is supported in a tool punch holder, which holders are moved towards each other along the stroke axis independently of each other for processing of the workpiece. The independent movement of the tool punch and the tool die by means of two independent drives makes it possible, for example, for a punching operation to be carried out above or below the workpiece plane. For example, first the tool die can be positioned in the processing position, and then, for processing by punching, the tool punch can be lowered onto the tool die to process the workpiece resting on the support face of the tool die.

In some embodiments, the presence of the tool punch and/or the tool die in the processing position is detected. The presence of the tool die or the tool punch in the processing position can be detected with precision to enable reliable processing of the workpiece and to inhibit (e.g., prevent) the workpiece from being unintentionally moved downwards beyond the processing position by the tool punch, and thereby possibly being deformed in addition, and/or to inhibit (e.g., prevent) the workpiece from being partially lifted from the workpiece support by the tool die. Detection can be carried out by means of a control device capable of accessing data on the formed shapes made in the workpiece, especially on the spacing of the underside of the region to be processed relative to the workpiece plane. In addition or as an alternative, it is also possible for sensors, e.g., pressure sensors, capacitive sensors, etc., to be provided in order to monitor the attainment of the processing position by the tool die or the tool punch.

In some examples, when the workpiece is being processed in a processing position that is located below the support plane, a tool shank of the tool punch is disposed above the support plane. The tool shank, i.e., the region of the tool punch that is supported in the tool punch holder, widens outwards and therefore it may be desirable if that region is not brought into engagement with formed shapes of small dimensions. It may therefore be advantageous for the tool punch to extend below the support plane by only the punch head, which adjoins the tool shank and has a smaller width. In particular, it is possible to select a tool punch that is suitable for processing a given formed shape. The punch head of the selected tool punch can have a length that is greater than the distance between the support plane and the respective processing position below the support plane, i.e., the length of the punch head or the tool punch and the processing position in the stroke direction are so coordinated with each other that the tool shank remains above the workpiece support during processing.

A further aspect of the invention provides a plate workpiece processing tool that includes a workpiece support, a tool punch, and a tool die. The processing tool also includes a control unit that is configured/programmed to move the tool punch and the tool die along the stroke axis to a processing position above or below a support plane of the workpiece support to process a formed shape of a workpiece that projects upwards or downwards beyond a support plane on the workpiece support. Where a punching operation is to be performed on a workpiece in a region above or below the support plane or workpiece plane, generally the tool die is positioned in the processing position first and then the tool punch is lowered towards the stationary tool die. Alternatively, punching can be performed by pressing the tool die against the stationary tool punch from below with a stroke movement or by simultaneously moving both the tool punch and the tool die towards each other along the stroke axis.

In some embodiments, the processing tool also includes a tool punch holder for supporting the tool punch, a tool die holder for supporting the tool die, and a tool drive by means of which the tool punch holder and the tool die holder are movable along the stroke axis. The tool drive may include two drive units that can be actuated independently of each other, i.e., for driving the tool punch holder and the tool die holder independently. The tool punch holder and the tool die holder may in this case be in the form of mono-tool holders to and on which different tools may be selectively secured and supported.

In some cases, the tool die is in the shape of a pyramidal frustum or a conical frustum and has a support face for supporting the workpiece. Such a geometry of the tool die can be beneficial for avoiding collision with the peripheral regions of the formed shape as the tool die is being raised above the workpiece plane and before the tool die reaches the processing position. For that purpose, the tool die can be taller than customary tool dies and can be configured to have a smaller support face. The tool die may also have another, asymmetric, geometry that is adapted to the geometry of the formed shape that is to be processed. If a punching die is used as the tool die, one or more apertures for engagement of a punch head may be formed at the top surface.

In some embodiments, the processing tool includes a sensor unit for detecting the presence of the tool punch and/or the tool die in the processing position. The sensor unit can include one or more pressure sensors, optical sensors, etc. Alternatively or additionally, the sensor unit can include capacitive sensors for measuring the potential between workpiece and tool die or tool punch. Before processing of the workpiece is carried out, the measurement data provided by the sensors can be compared with data, relating to the type and size of the formed shape, that is stored in the control unit.

Other aspects, features, and advantages of the invention will be apparent from the description, the drawings, and the claims. The features mentioned above and the features set forth hereinafter may also be used individually or a plurality thereof may be used in any desired combination. The embodiments shown and described are not to be understood as forming a definitive list, but rather are of the nature of examples for illustrating the invention.

DETAILED DESCRIPTION

Figure 1:
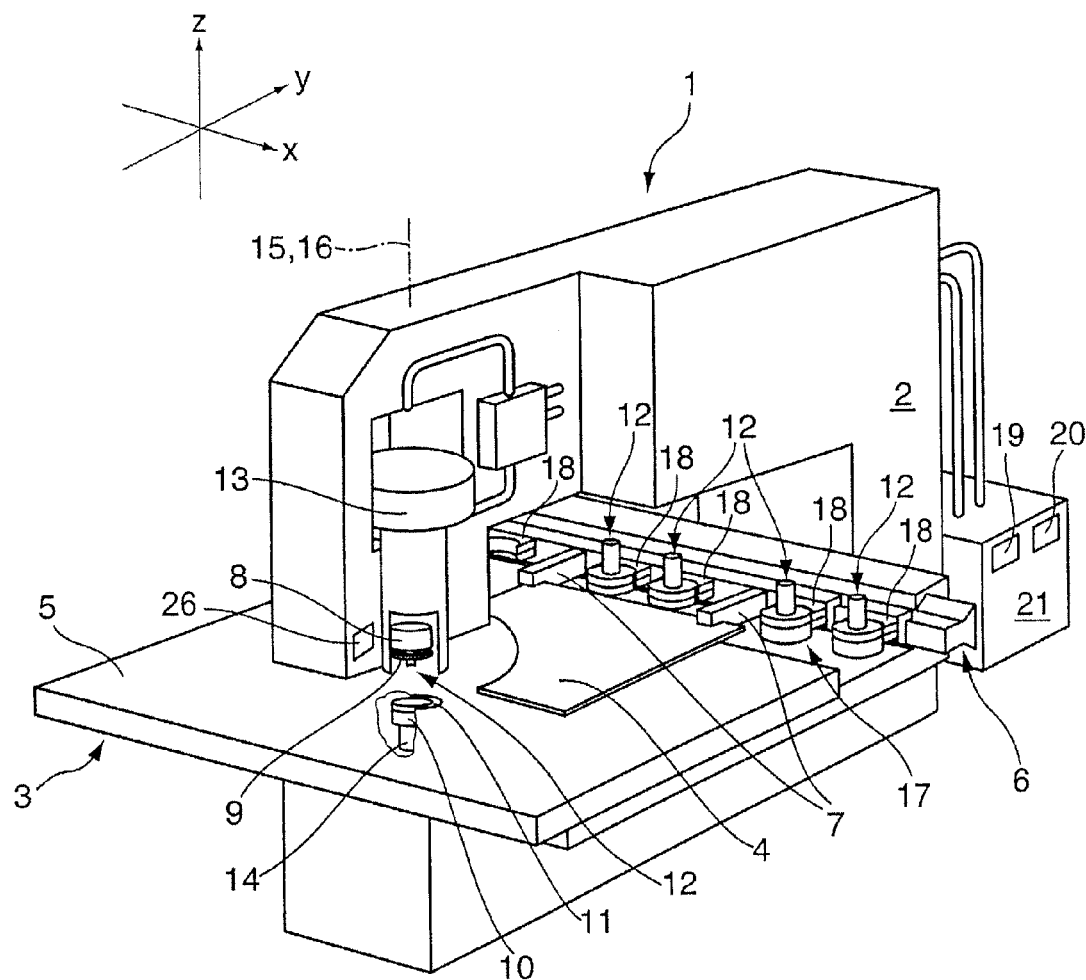
FIG. 1 is a schematic illustration of a plate workpiece processing tool.

FIG. 1 shows a plate workpiece processing tool for cutting and/or forming plate workpieces in the form of a punching/forming machine 1 for processing metal sheets. The punching/forming machine 1 has a C-shaped machine frame 2 having, arranged in the throat thereof, a workpiece support in the form of a workpiece table 3 which serves to support a workpiece, e.g., a metal sheet 4, which is to be processed. The workpiece table 3 defines a horizontal support plane 5 for the metal sheet 4 to be processed. The support plane 5 extends parallel to the x/y plane of the coordinate system shown in FIG. 1. By means of a coordinate guide 6, the metal sheet 4, which is clamped in position by means of clamps 7, is movable in the support plane 5 of the workpiece table 3.

A tool punch holder 8 is arranged at a front end of an upper arm of the C-shaped machine frame 2. The tool punch holder 8 is configured to support a tool punch 9. A tool die holder 10 is arranged at a front end of a lower arm of the C-shaped machine frame 2. The tool die holder 10 is configured to support a tool die 11. The tool punch 9 and the tool die 11 form a tool 12 for processing the metal sheet 4 by cutting and/or forming.

The punching/forming machine 1 also includes a drive unit for driving the tool punch holder 8 and the tool die holder 10. The drive unit includes a punch drive 13 and a die drive 14 in the form of linear drives. The tool punch holder 8, together with the supported tool punch 9, can be raised and lowered relative to the workpiece table 3 along a stroke axis 15 via the punch drive 13. In a comparable manner, the tool die holder 10, together with the supported tool die 11, can be raised and lowered relative to the workpiece table 3 along the stroke axis 15 by means of the die drive 14. In addition, the tool punch holder 8 and the tool die holder 10 can be adjusted with regard to their rotational position about a tool rotation axis 16, which is identical to the stroke axis 15, by means of a tool turning drive.

A linear magazine 17 with further tools 12 is provided on the coordinate guide 6. The tools 12 situated in the linear magazine 17 are each held by a tool cassette 18 and can each be secured to the tool punch holder 8 and the tool die holder 10 as required for processing of the metal sheet 4.

During tool-changing and during processing of a workpiece, all of the drives of the punching/forming machine 1 are controlled by means of a numerical control unit 21. The numerical control unit 21 can include storage means 19 (e.g., memory storage) for storing data associated with the workpiece 4 and/or the tool 12, and control means 20 (e.g., a processor) for calculating and controlling the raising, lowering and rotational movements of the tool punch holder 8 and the raising, lowering and rotational movements of the tool die holder 10 based, at least in part, on the data stored on the storage means 19.

Figure 2A:
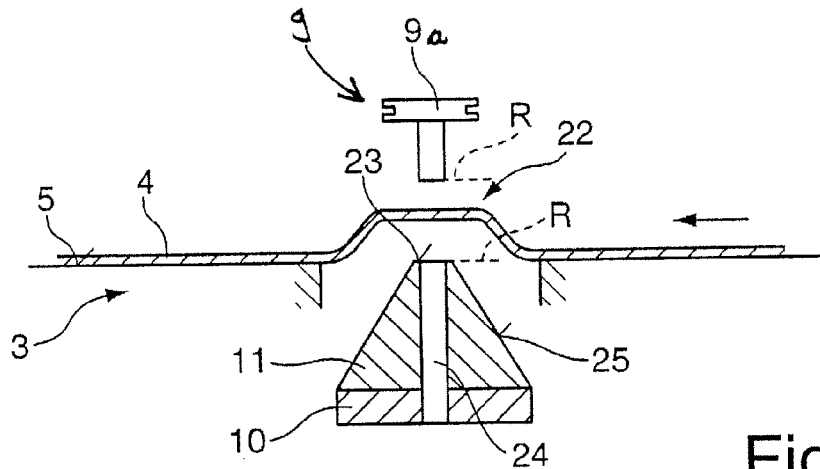
FIGS. 2a-c illustrate a punching operation being performed on an upwardly formed shape on a workpiece using the plate workpiece processing tool of FIG. 1.
Figure 2B:
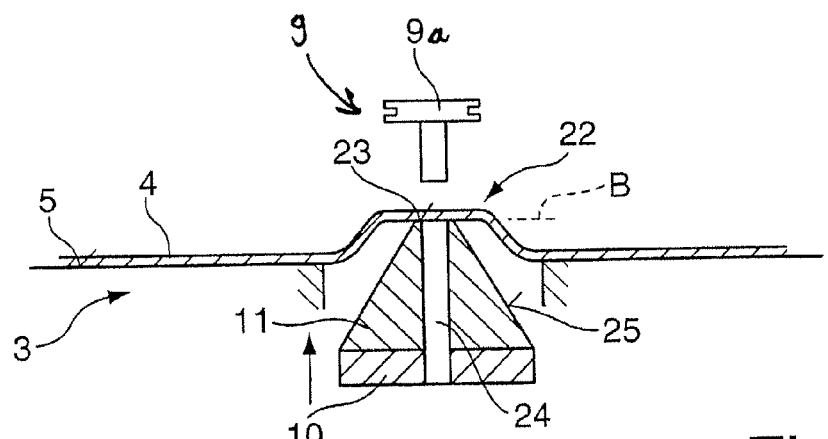
Figure 2C:
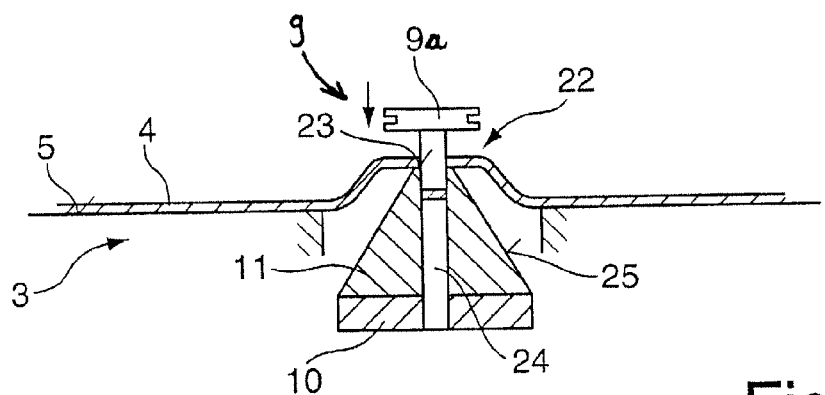

FIGS. 2a-c illustrate a procedure for punching the workpiece 4 in a region of a groove-like formed shape 22 projecting upwards beyond the support plane 5. The formed shape 22 has been produced in the workpiece 4 in a previous step by roll-forming using a forming tool which, as explained above, has subsequently been replaced by the punching tool 9, 11 shown in FIGS. 2a-c.

As indicated by an arrow in FIG. 2a, for processing by punching the workpiece 4 is first moved in the support plane 5 of the workpiece table 3 by means of the coordinate guide 6 until the region of the formed shape 22 that is to be processed by punching is positioned above the die 11. During that movement, the pyramidal or conical die 11 is in a home position R in the Z-direction (direction of gravity) in which a support face 23 formed on the top surface of the die 11 is flush with the workpiece plane 5. The tool punch 9 also adopts here a home position R above the workpiece support 5.

As shown in FIG. 2b, the die 11 is subsequently raised until it reaches a processing position B in the Z-direction, at which the support face 23 of the die 11 reaches the underside of a flat region on the formed shape 22, which region is to be processed. The tool die 11 is positioned in the processing position B by the control unit 21, i.e., the movement along the stroke axis 15 is stopped as soon as the support face 23 reaches the underside of the formed shape 22. The attainment of the processing position B by the die 11, or by the support face 23, can be detected via a sensor unit 26 of the punching/forming machine 1 (FIG. 1), for example by means of pressure sensors or optical sensors, but it is also possible for the control unit 21 to specify the stroke of the tool die 11 required to attain the processing position B on the basis of the known data on the formed shape of the workpiece 4, without the assistance of sensors.

As can also be seen in FIG. 2b, the die 11 can be matched to the geometry of the formed shape 22 in such a way that it can be raised above the workpiece plane 3 without this resulting in a collision with the workpiece 4 before the die 11 reaches the processing position B. In this regard, both the size of the support face 23 and also the angle formed by a lateral surface 25 of the die 11 and the support face 23 or the plane 5 of the metal sheet (in the present case approximately 45°, typically between approximately 20° and approximately 80°) can be selected such that the lateral surface 25 of the die 11 does not collide with the peripheral regions of the formed shape 22 before the support face 23 reaches that region of the formed shape 22 that is to be processed. A tool 12 suitable for processing a given formed shape 22 can be selected from the linear magazine 17 by the control unit 21 and can be secured in the tool die holder 10 and the tool punch holder 8 as described above.

Punching is then carried out on the region of the formed shape 22 resting on the support face 23 in the processing position B by lowering the punch 9 onto the die 11 and in so doing bringing it into engagement with an aperture 24 provided at the support face 23 (FIG. 2c). After processing by punching, in which the punch 9 may also process the workpiece 4 with a plurality of punching strokes, the die 11 may be returned to the home position R shown in FIG. 2a in order for the workpiece 4 to be processed at a different place.

It is not imperative for the die 11 to be positioned in the processing position B. In cases where further upward or downward forming operations are to be performed on the region to be processed, the die 11 can be raised and, at the same time, the tool punch 9 can be lowered in order for the workpiece 4 to be formed above the workpiece support 3.

Figure 3A:
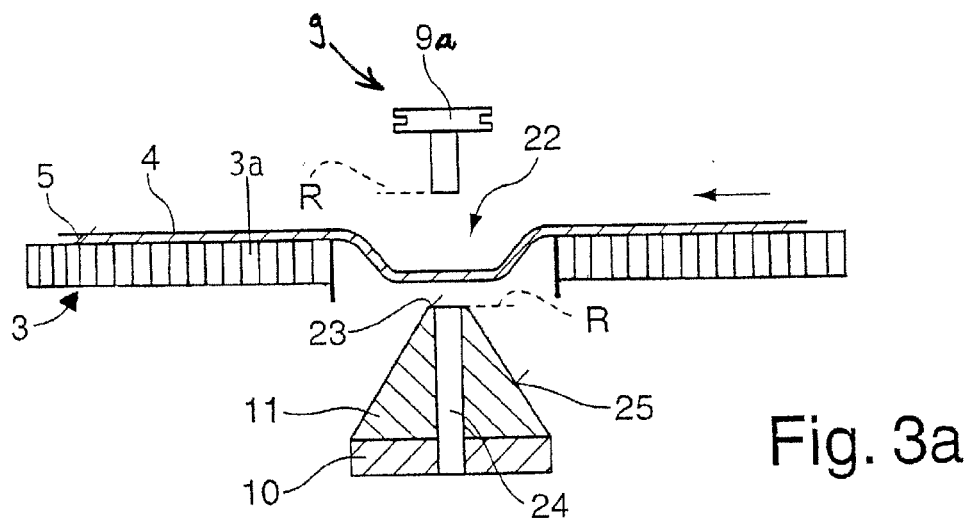
FIGS. 3a-c illustrate a punching operation begin performed on a downwardly formed shape on a workpiece using the plate workpiece processing tool of FIG. 1.
Figure 3B:
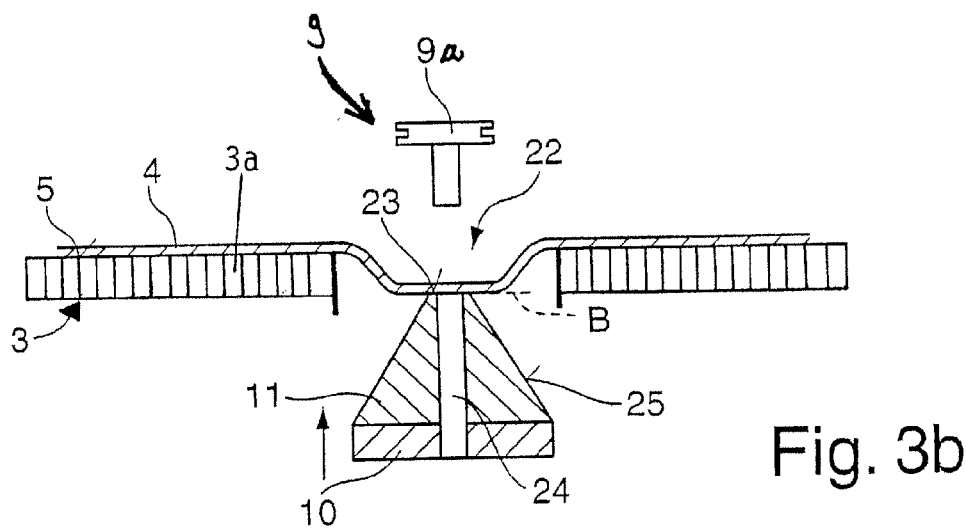
Figure 3C:
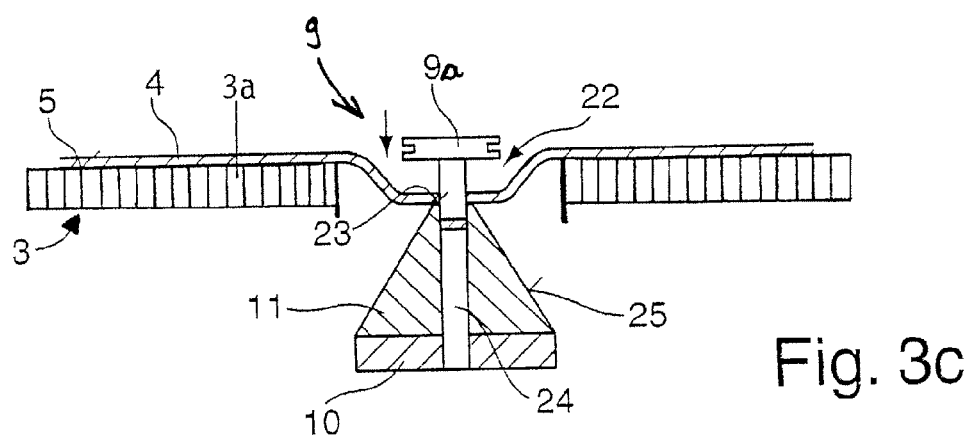

FIGS. 3a-c show a processing operation being performed on a workpiece 4 in which, in contrast to the workpiece 4 shown in FIGS. 2a-c, the formed shape does not project upwards but projects downwards beyond the support plane 5 of the workpiece 4. Referring to FIG. 3a, for example, the support plane 5 of the workpiece 4 is formed by the top surface of a bristle carpet 3a formed on the processing table 3, the bristles of which are bent down to provide the necessary room for the formed shape 22 when the workpiece 4 is being moved in the support plane 5 by means of the coordinate guide 6. The processing operation otherwise proceeds analogously to the processing operation described in FIGS. 2a-c, with the difference that the processing position B is not above the support plane 5 in the workpiece support 3, but is below it, so that the punch 9 is moved below the support plane 5 in order for the formed shape 22 to be processed. In that operation, a punch shank 9a, with which the punch is supported on the tool punch holder 8 (FIG. 1), remains above the support plane 5 to allow the punch head, or rather its cutting edge, formed on the punch 9 to be engaged by the formed shape 22 without the punch shaft 9a acting as an obstructing contour.

In addition to the formed shapes shown in FIGS. 2a-c and FIGS. 3a-c in the form of a groove, as are typically produced by roll-forming, other, for example gill-like louver, formed shapes can be made in the workpiece 4 by suitable forming tools. Such formed shapes also may be processed above or below the workpiece plane 5 in the manner described above. All in all, processing by punching and/or forming may be performed in the manner described above with high precision also in upwardly formed or downwardly formed regions of a workpiece. In some cases, the role of punch 9 and die 11 may be interchanged as compared with the arrangement shown in FIGS. 2a-c and FIG. 3a-c, such that the punch 9 is disposed below and the die 11 is disposed above the support plane 5.

A number of embodiments of the invention have been described. Nevertheless, it will be understood that various modifications may be made without departing from the spirit and scope of the invention. Accordingly, other embodiments are within the scope of the following claims.

What is claimed is:

1. A method of processing a plate workpiece, the method comprising:
   supporting the plate workpiece on a workpiece support;
   forming a formed shape in the plate workpiece while the plate workpiece is supported on the workpiece support using a forming tool, the formed shape extending upwardly or downwardly from a support plane of the workpiece support, the forming tool being secured to a tool die holder and a tool punch holder, the tool die holder and the tool punch holder being tool holders to which different tools can be secured;
   replacing the forming tool with a punching tool, the punching tool comprising a tool die and a tool punch, the tool die being secured to the tool die holder and the tool punch being secured to the tool punch holder; and
   after replacing the forming tool with the punching tool, moving the tool die and the tool punch of the punching tool along a stroke axis, toward a processing position above or below the support plane, and into contact with the plate workpiece in a region of the formed shape, thereby processing the plate workpiece in the region of the formed shape.

2. The method of claim 1, wherein forming the formed shape in the plate workpiece comprises roll-forming the formed shape.

3. The method of claim 1, further comprising, following the forming of the formed shape, moving the plate workpiece along the support plane toward a position in which the formed shape intersects the stroke axis.

4. The method of claim 1, further comprising moving the tool punch and the tool die to a home position in which the tool die does not project upwards beyond the support plane and the tool punch does not project downwards beyond the support plane.

5. The method of claim 1, wherein the tool die is supported in the tool die holder and the tool punch is supported in the tool punch holder, and wherein moving the tool die and the tool punch along the stroke axis comprises moving the tool die holder and the tool punch holder along the stroke axis.

6. The method of claim 1, wherein moving the tool die and the tool punch along the stroke axis comprises moving the tool die and the tool punch independently of each other along the stroke axis.

7. The method of claim 1, further comprising detecting the presence of the tool die in the processing position.

8. The method of claim 1, further comprising moving the plate workpiece along the support plane toward a position in which the formed shape intersects the stroke axis.

9. The method of claim 8, wherein the movement of the plate workpiece is carried out by a coordinate guide.

10. The method of claim 1, further comprising:
    selecting the tool punch and the tool die, wherein the tool punch and the tool die are matched to a geometry of the formed shape of the plate workpiece; and
    before processing the plate workpiece in the region of the formed shape, securing the selected tool punch to the tool punch holder, and securing the selected tool die to the tool die holder.

* * * * *